(12) United States Patent
Roy et al.

(10) Patent No.: US 11,364,589 B2
(45) Date of Patent: Jun. 21, 2022

(54) METHOD OF MAKING WOOD FLOORING BOARDS

(71) Applicant: BOA-FRANC, S.E.N.C., Saint-Georges (CA)

(72) Inventors: Sébastien Roy, Notre-Dame-des-Pins (CA); Jonathan Cloutier, Beauceville (CA); Marie-Christine Ouellet, Saint-Georges (CA)

(73) Assignee: BOA-FRANC, S.E.N.C., Saint-Georges (CA)

( * ) Notice: Subject to any disclaimer, the term of this patent is extended or adjusted under 35 U.S.C. 154(b) by 633 days.

(21) Appl. No.: 16/448,013

(22) Filed: Jun. 21, 2019

(65) Prior Publication Data

US 2020/0016723 A1 Jan. 16, 2020

Related U.S. Application Data

(60) Provisional application No. 62/697,175, filed on Jul. 12, 2018.

(51) Int. Cl.
*B24C 1/04* (2006.01)
*G06T 7/00* (2017.01)
(Continued)

(52) U.S. Cl.
CPC ............... *B24C 1/04* (2013.01); *B27G 1/00* (2013.01); *G05B 19/401* (2013.01);
(Continued)

(58) Field of Classification Search
CPC ......... B24C 1/04; B27G 1/00; G05B 19/401; G05B 2219/45229; G06T 7/0004; G01N 2021/8864
See application file for complete search history.

(56) References Cited

U.S. PATENT DOCUMENTS 3,547,170 A * 12/1970 Bauer ...................... B27G 1/00
144/365
3,931,501 A 1/1976 Barr et al.
(Continued)

FOREIGN PATENT DOCUMENTS

CA 2706781 A1 * 12/2011 ........... C09K 3/1409
CN 1059114 A 3/1992
(Continued)

OTHER PUBLICATIONS

T. R. Ren, N. M. Kwok, D. K. Liu and S. D. Huang, "Path planning for a robotic arm sand-blasting system," 2008 International Conference on Information and Automation, 2008, pp. 1067-1072, doi: 10.1109/ICINFA.2008.4608157. (Year: 2008).*
(Continued)

*Primary Examiner* — Michael Robert Cammarata
(74) *Attorney, Agent, or Firm* — Norton Rose Fulbright Canada LLP; Alexandre Daoust

(57) ABSTRACT

The method can include obtaining a digital image of a wood board having a defect, the digital image including a representation of the defect; using a computer: mapping the position and shape of the representation of the defect, and generating blasting instructions based on the mapped position and shape; positioning the wood board in a given position in a cleaning station, the cleaning station having a blasting nozzle and holding the wood board in its coordinate system; and the cleaning station automatically moving the blasting nozzle relative to the wood board and blasting the defect based on the blasting instructions, including moving at least one of the blasting nozzle and the wood board relative to a frame of the cleaning station.

23 Claims, 7 Drawing Sheets

(51) Int. Cl.
*B27G 1/00* (2006.01)
*G05B 19/401* (2006.01)
*G01N 21/88* (2006.01)

(52) U.S. Cl.
CPC .... *G06T 7/0004* (2013.01); *G01N 2021/8864* (2013.01); *G05B 2219/45229* (2013.01)

(56) References Cited

U.S. PATENT DOCUMENTS

| | | | |
|---|---|---|---|
| 4,044,507 A | 8/1977 | Cox et al. | |
| 4,149,089 A | 4/1979 | Idelsohn et al. | |
| 4,268,934 A | 5/1981 | Testone | |
| 4,614,555 A * | 9/1986 | Smith | B27G 1/00 156/356 |
| 4,984,172 A * | 1/1991 | Luminari | G01N 21/8986 250/559.46 |
| 5,117,366 A | 5/1992 | Stong | |
| 5,718,767 A | 2/1998 | Crum et al. | |
| 8,074,320 B2 | 12/2011 | Batchelder et al. | |
| 8,253,793 B2 | 8/2012 | Hiraoka | |
| 8,303,720 B2 | 11/2012 | Pastoor | |
| 8,661,609 B2 | 3/2014 | Knopow et al. | |
| 8,903,529 B2 | 12/2014 | Suzuki | |
| 8,966,707 B2 | 3/2015 | Morse et al. | |
| 9,254,579 B2 | 2/2016 | Tolonen et al. | |
| 9,308,624 B2 | 4/2016 | Hibino et al. | |
| 9,483,043 B2 * | 11/2016 | Miller | G06F 3/0482 |
| 11,052,536 B2 * | 7/2021 | Jetté | B25J 9/0069 |
| 2006/0211339 A1 | 9/2006 | Woods | |
| 2008/0099105 A1 * | 5/2008 | Kelly | B27G 1/00 144/373 |
| 2008/0176487 A1 | 7/2008 | Armstrong | |
| 2011/0194735 A1 * | 8/2011 | Massen | B27G 1/00 382/108 |
| 2014/0046471 A1 * | 2/2014 | Bamford | G05B 19/048 901/44 |
| 2017/0231446 A1 | 8/2017 | Watanabe et al. | |
| 2017/0296021 A1 | 10/2017 | Li et al. | |
| 2018/0326591 A1 * | 11/2018 | Häusler | G06V 10/98 |
| 2018/0372651 A1 * | 12/2018 | Kalwa | B27N 3/143 |
| 2020/0016723 A1 | 1/2020 | Roy et al. | |

FOREIGN PATENT DOCUMENTS

| | | | |
|---|---|---|---|
| CN | 1112986 C | 1/2002 | |
| CN | 102462226 A | 5/2012 | |
| CN | 105643469 A | 6/2016 | |
| DE | 2534023 | 7/1975 | |
| EP | 2047934 | 4/2009 | |
| JP | 4236607 A2 | 8/1992 | |
| JP | 2000317391 A | 11/2000 | |
| KR | 100524364 B1 | 10/2005 | |
| WO | 02062194 A1 | 8/2002 | |
| WO | WO-2016058104 A1 * | 4/2016 | C08F 293/005 |
| WO | 2017033147 | 3/2017 | |
| WO | 2017072405 | 5/2017 | |
| WO | 2020053473 | 3/2020 | |
| WO | WO-2021045993 A1 * | 3/2021 | |

OTHER PUBLICATIONS

J. Moody and P. Klinkhachorn, "Automated lumber processing system (ALPS): an industrial prototype," Proceedings of Thirtieth Southeastern Symposium on System Theory, 1998, pp. 476-479, doi: 10.1109/SSST.1998.660119. (Year: 1998).*

R. W. Conners, et al, "Identifying and Locating Surface Defects in Wood: Partofan Automated Lumber Processing System," in IEEE Transactions on Pattern Analysis and Machine Intelligence, vol. PAMI-5, No. 6, pp. 573-583, Nov. 1983, doi: 10.1109/TPAMI.1983.4767446. (Year: 1983).*

X. Li et al., "A Semi-Automatic System for Grit-Blasting Operation in Shipyard," 2018 IEEE 23rd International Conference on Emerging Technologies and Factory Automation (ETFA), 2018, pp. 1133-1136, doi: 10.1109/ETFA.2018.8502625. (Year: 2018).*

S. Jabo, Chalmers, Machine vision for wood defect detection and classification, http://publications.lib.chalmers.se/records/fulltext/136883.pdf Accessed on Jan. 30, 2018.

* cited by examiner

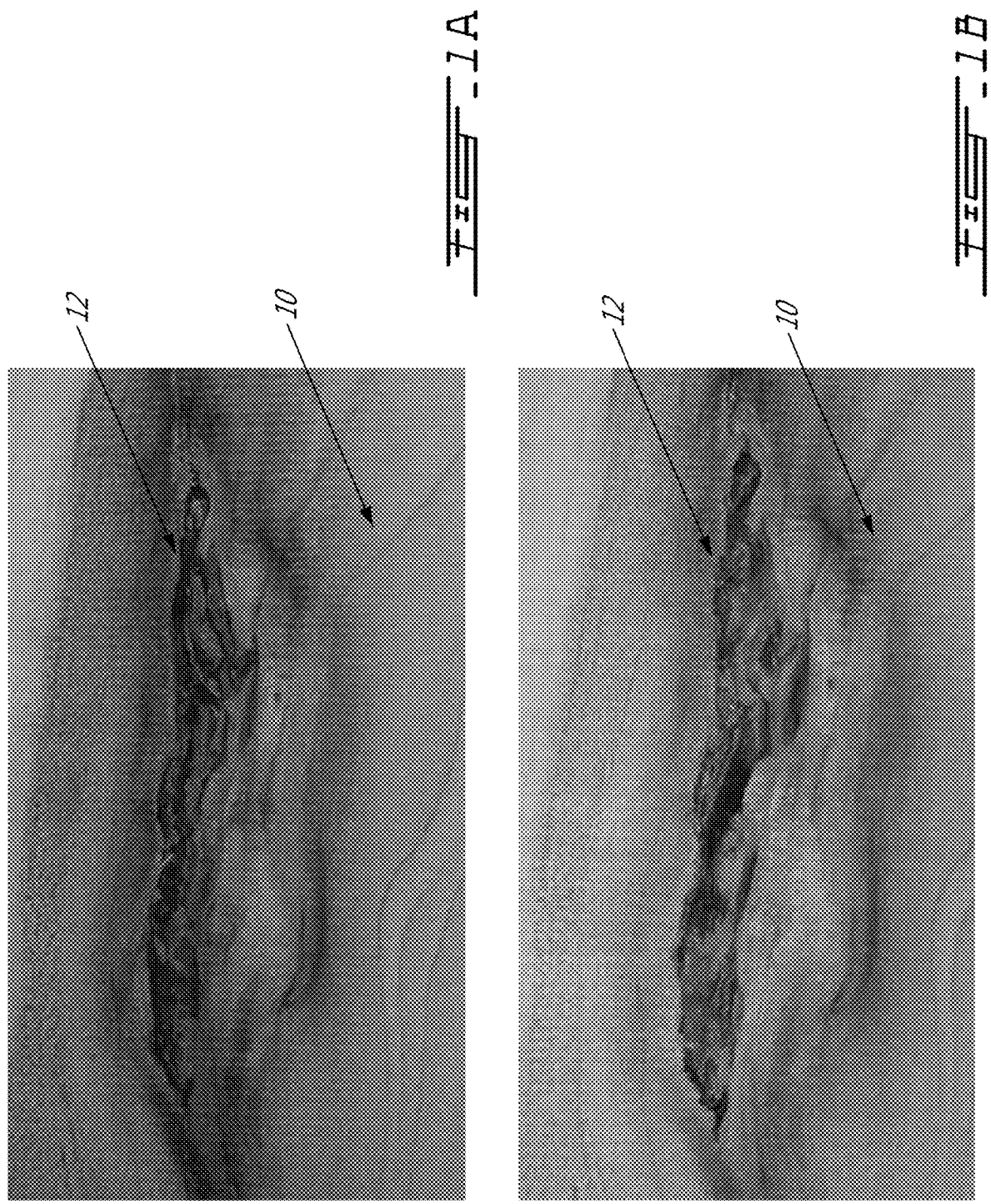

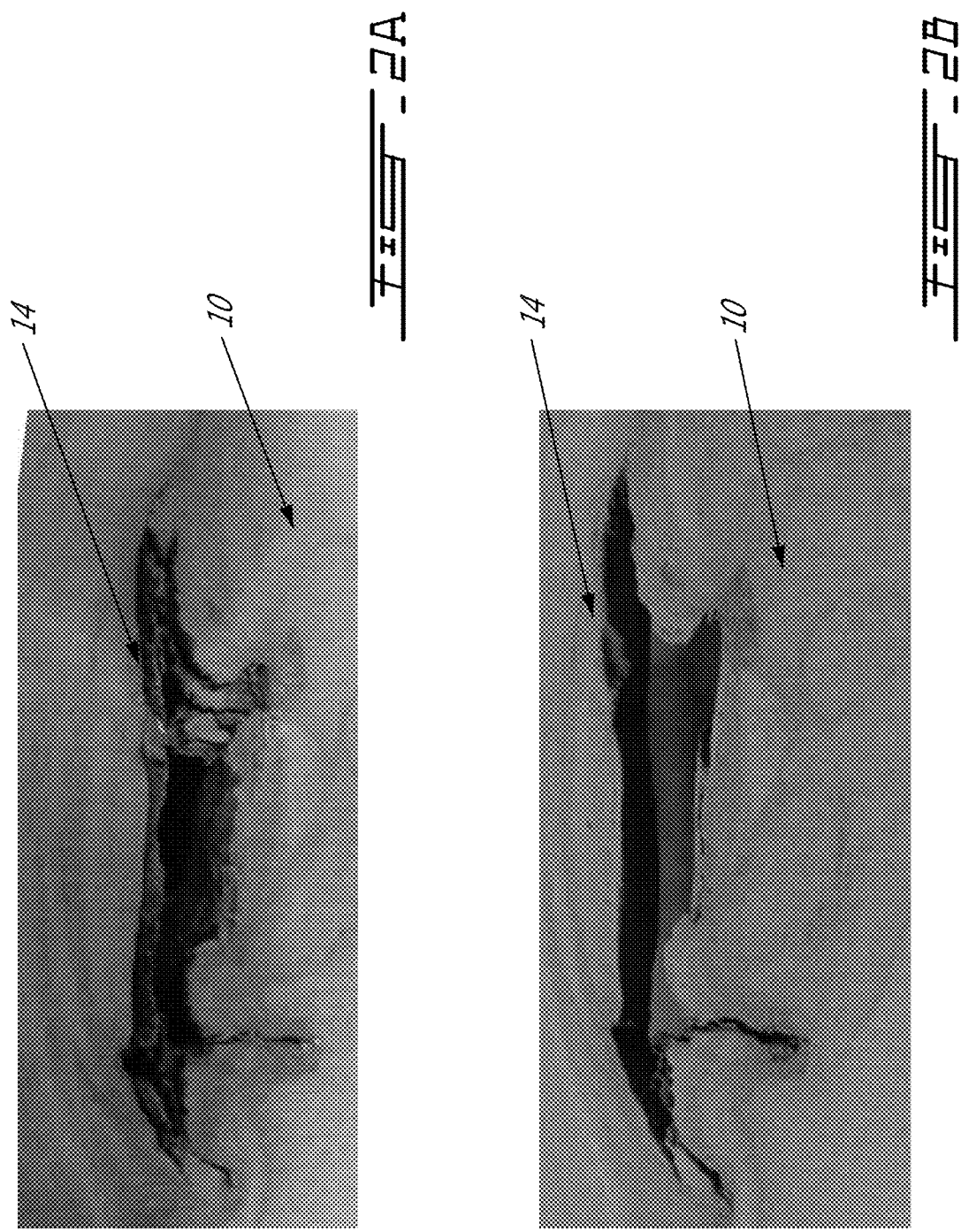

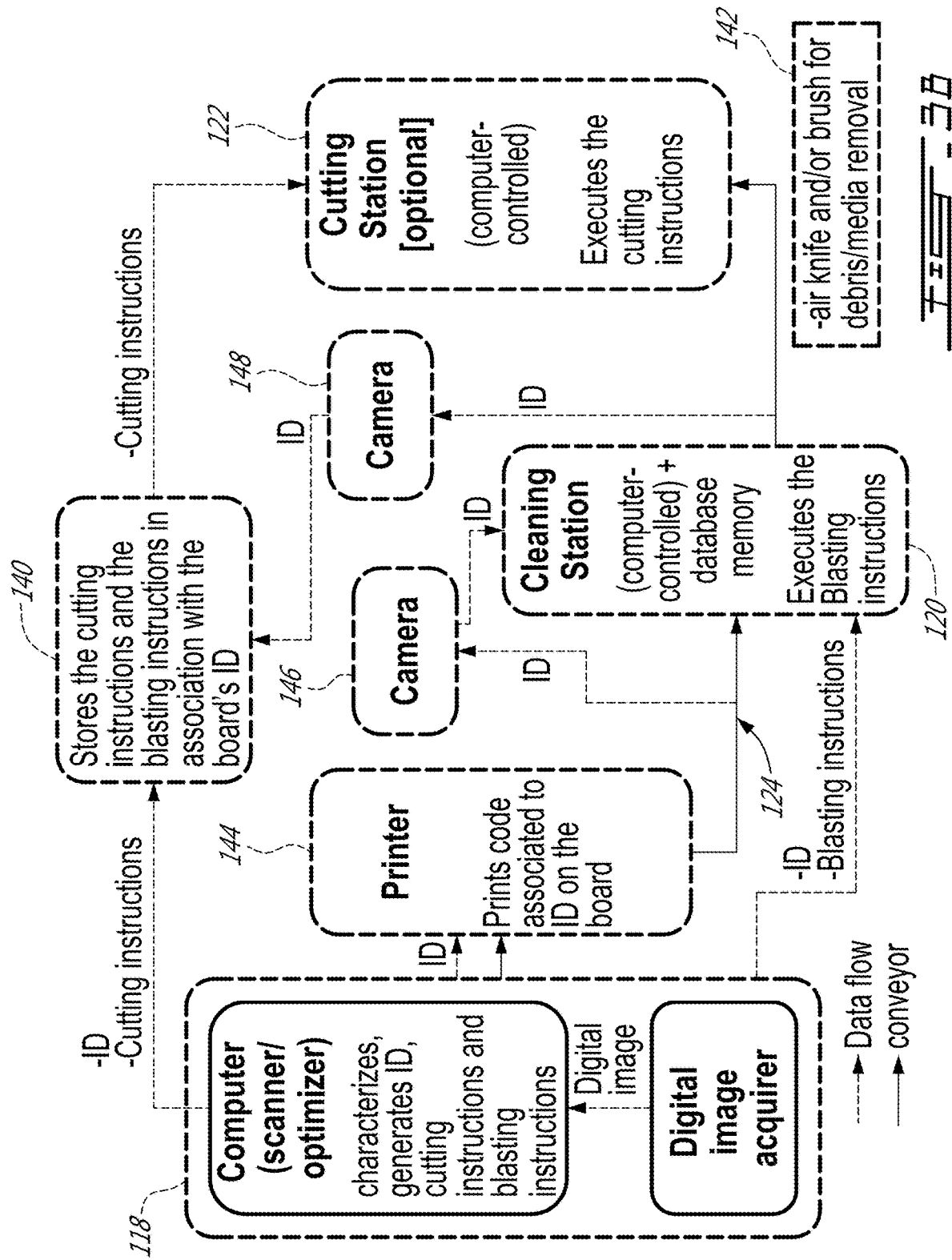

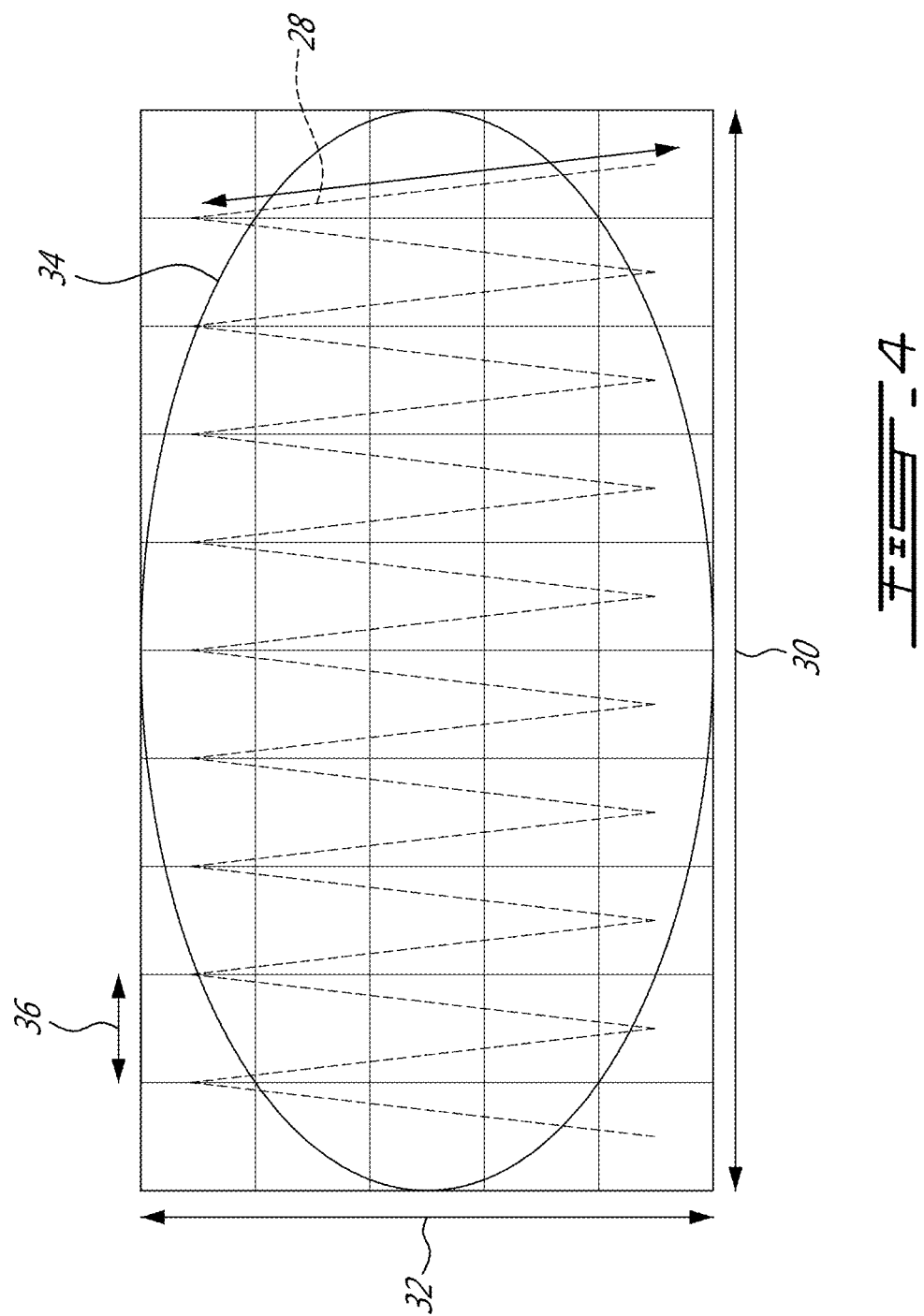

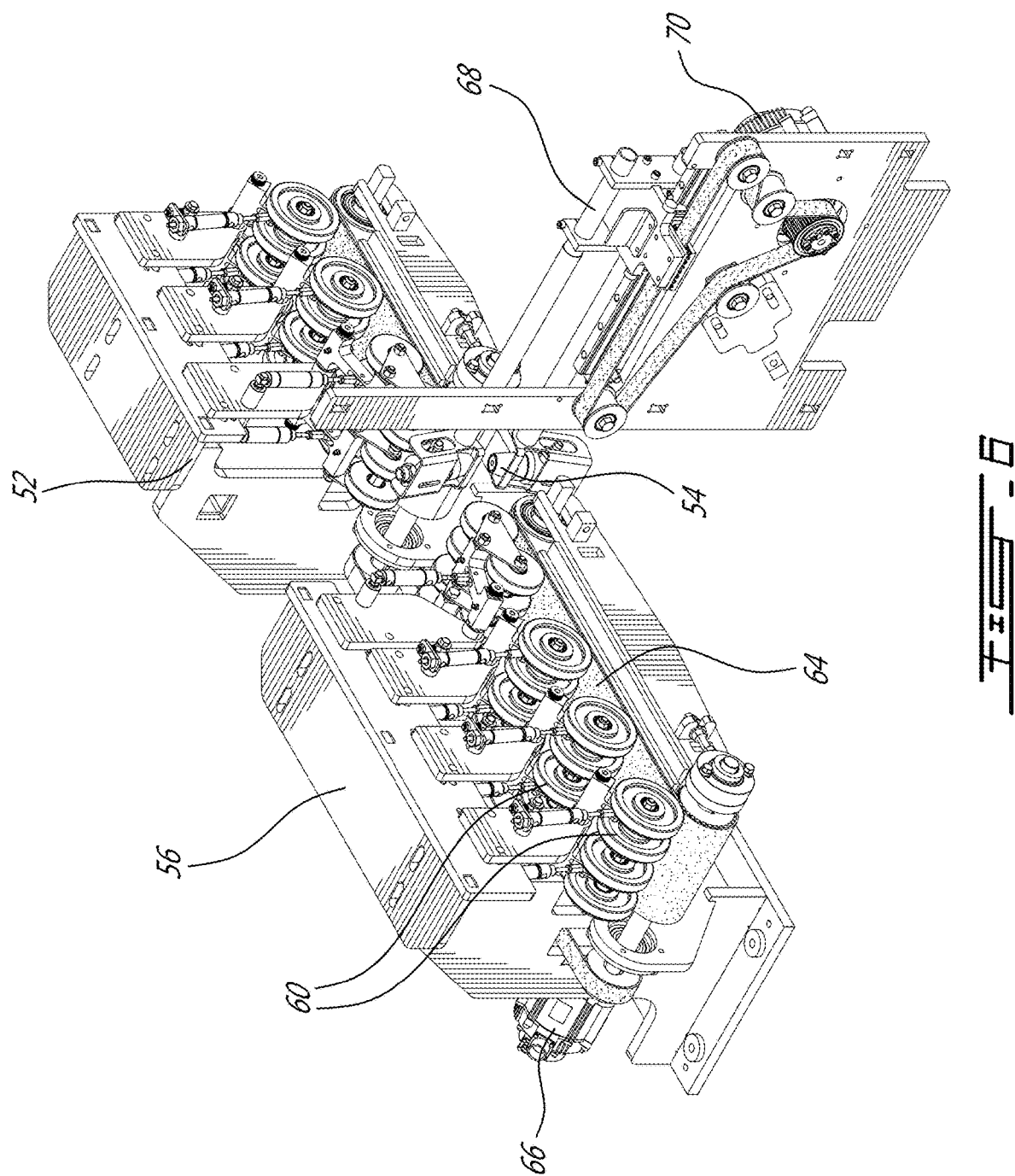

METHOD OF MAKING WOOD FLOORING BOARDS

BACKGROUND

Two main types of wood flooring boards exist: classic wood flooring boards and engineered wood flooring boards. Classic wood flooring boards are made of a single layer hardwood board, whereas engineered wood flooring boards are made of a top layer hardwood board, typically referred to as a lamella, superposed to one or more additional layers such as a core and a base layer. The single layer hardwood board of classic wood flooring boards, and the top layer hardwood board of engineered wood flooring boards, are made of timber. It is well known in the field that timber is prone to having imperfections. When boards are sawn from the timber, one or more imperfections, commonly referred to as defects, such as a bark inclusion, knot, hole or pith, can be exposed on a surface of the board, for instance. The presence of a single defect affects the quality grade of the entire board, and the value of a board of a given type of wood is typically affected by both its dimensions and its grade. In some cases, it can even be worthwhile to remove a portion having the imperfection because even though it reduces the length of the board and therefore it's dimensional value factor, it can increase its grade and the corresponding increase in value stemming from the increase in the grade can exceed the diminution in value stemming from the reduction of dimension.

It is common in the wood industry to address such issues in a computer-implemented process referred to as "optimizing", which is relatively well developed as a technology. Optimizing is typically performed using a system commonly referred to as an optimizer or, because this system typically also includes an image acquirer, it can also be referred to as a scanner. This system scans the board, characterizes defects and produces a cutting solution via which one or more smaller boards having a better grade can be cut out of the scanned board. However, while former optimizing techniques were satisfactory to a certain extent, there always remains room for improvement.

SUMMARY

In some cases, the grade of a board having a surface imperfection can be increased by filling the defect with a "wood filler" which is typically applied in the form of a putty, before the final sanding and finishing.

In some cases, partially loose or otherwise removable particles such as bark fragments are present in the imperfection. To be effective, the application of the wood filler should be performed on a stable surface, free of such loose or removable particles. Indeed, the presence of such particles underneath the wood filler has been known to cause issues such as loosening or detachment of the wood filler from the defect, which is undesirable. This is especially the case in scenarios where the boards are subjected to sanding, or to a coarse brushing intended to bring out a better wood grain appearance as known in the art, as these processes can impart significant shear stress on the wood filler.

To a certain extent, such loose or removable particles can be removed by trained technicians using a tool such as a blade or hook before application of the wood filler. It will be understood, however, that this step was time consuming and somewhat artisanal, and there can therefore be significant variability in the quality of the particle removing step. Indeed, on some boards, the wood filler was still loosened or lost later in the finishing process, causing at best a loss of efficiency and in some cases also a waste of materials. Given that wood flooring is a commodity subject to international cost competition and thin profit margins, even a small loss in efficiency can render a process unviable from the economic perspective. Accordingly, manual particle removal met limited success in an industrial wood flooring production setting.

It was considered to perform the particle removal/cleaning step by sandblasting. However, the presence of sand particles which could remain in the wood board/defect following the cleaning was undesired, and this was considered a risk. Moreover, sandblasting may also have a visible effect on the portions of the board surrounding the defect.

It was found that various other media than sand existed and could be blasted onto the defect to perform the particle removal/cleaning step, and it turned out that at least some media were suitable for this operation in the sense that they were efficient in particle removal, did not undesirably affect the surrounding portions of the wood board, and did not pose the risk of leaving sand particles in the defects. Indeed, various blasting techniques exist in which a medium can be "blasted" onto the destination material via a blast nozzle, using appropriate equipment. This includes sand blasting, in which the medium is sand, but it was found that blasting with other media than sand could be even better adapted to the context at hand, in some embodiments.

FIGS. 1A and 1B show an example of a wood board 10 having a first defect 12 before (1A), and after (1B) blasting, respectively, and FIGS. 2A and 2B show an example of a second defect 14 before, and after blasting respectively. In the case of FIGS. 1A and 1B, the defect penetrates partially into the thickness of the wood board 10, whereas in FIGS. 2A and 2B, the defect penetrates completely across the thickness of the wood board 10, forming a hole.

It was found that an interesting aspect of blasting was that it could effectively be machine-controlled, an important factor on the road to industrial automation. However, defects do not have the same shape, size and position from one board to another, and it is therefore not possible to use a same programmed routine, or blasting path, which could be used systematically on all the boards. Indeed, unless the automated blasting machine can be made to "see" the defect, and therefore ascertain its shape and position, it cannot be appropriately directed. Moreover, means would be required to allow to automatically generate a blasting path based on the ascertained shape and position of the defect, which may need to be performed in a relatively short period of time to allow satisfactory productivity in an industrial setting.

As presented in further detail below, these latter hurdles were overcome by using an artificial vision system and a blasting instruction generation system, and by ensuring that the machined-controlled (e.g. CNC: Computer Numerical Control) blast device can be made to operate in a common frame of reference relative to position of the defect in the image of the board. The artificial vision system is used to determine the shape and position of the contour of the defect on the board based on a scan/image of the board. The cleaning solution generation system can generate computer-readable blasting instructions, which can be in the form of a blast nozzle path mapped against coordinates of the board for instance, based on the digital image received from the artificial vision system.

Accordingly, in accordance with one aspect, there is provided a method of making a wood flooring board, the method comprising: obtaining a digital image of a wood board having a defect, the digital image including a representation of the defect; using a computer: mapping the position and shape of the representation of the defect, and generating blasting instructions based on the mapped position and shape; positioning the wood board in a given position in a coordinate system of a cleaning station, the cleaning station having a blasting nozzle and holding the wood board in its coordinate system; and the cleaning station automatically moving the blasting nozzle relative to the wood board and blasting the defect based on the blasting instructions, including moving at least one of the blasting nozzle and the wood board relative to a frame of the cleaning station.

In accordance with another aspect, there is provided a cleaning station for a wood flooring board, the cleaning station comprising: a wood board holder for holding the wood flooring board in a cleaning station, a blasting nozzle, and a computer-controlled mechanism configured to move the blasting nozzle relative to the wood board by moving either one, or both, of the wood board holder and the blasting nozzle in the cleaning station based on blasting instructions.

In accordance with another aspect, there is provided a system comprising a digital image acquirer, a computer configured and adapted to receive a digital image of a wood piece from the digital image acquirer, characterize at least one defect in the wood piece including determining a position of said defect on the wood piece, and generate computer-readable blasting instructions including a blasting path spanning the area of the defect in the digital image of the wood piece. A computer-controlled cleaning station can then access the digital image and move a blast nozzle relative to the wood piece to clean the wood piece based on the computer-readable blasting instructions.

It will be understood that the expression "computer" as used herein is not to be interpreted in a limiting manner. It is rather used in a broad sense to generally refer to the combination of some form of one or more processing units and some form of memory system accessible by the processing unit(s). The use of the expression "computer" in its singular form as used herein includes within its scope the combination of a two or more computers working collaboratively to perform a given function. Moreover, the expression "computer" as used herein includes within its scope the use of partial capacities of a processing unit of an elaborate computing system also adapted to perform other functions.

Similarly, the expression 'controller' as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIGS. 1A and 1B are graphical representations of digital images of a portion of a board having a defect, before and after blasting, respectively;

FIGS. 2A and 2B are graphical representations of digital images of a portion of a board having a defect, before and after blasting, respectively;

FIG. 3B is a block diagram of a system for making wood flooring boards, in accordance with another example;

FIG. 4 is a graphical representation of a blast nozzle path mapped against coordinates of a digital image of a wood board, in accordance with an example;

FIG. 6 is another oblique view of components of the cleaning station of FIG. 5, taken from the rear and the right-hand side.

DETAILED DESCRIPTION

As shown by comparing FIGS. 1B to 1A, and by comparing FIGS. 2B to 2A, blasting can be a suitable way of removing loose, partially loose or otherwise weak material forming an unsuitable substrate for wood filler application from certain types of defects in wood boards. In FIGS. 1A and 1B, the defect 12 is in a thicker wood board 10 destined to classic wood flooring, whereas in FIGS. 2A and 2B, the defect 14 is in a thinner wood board 10 for use as a lamella in an engineered wood board.

Figure 3A:
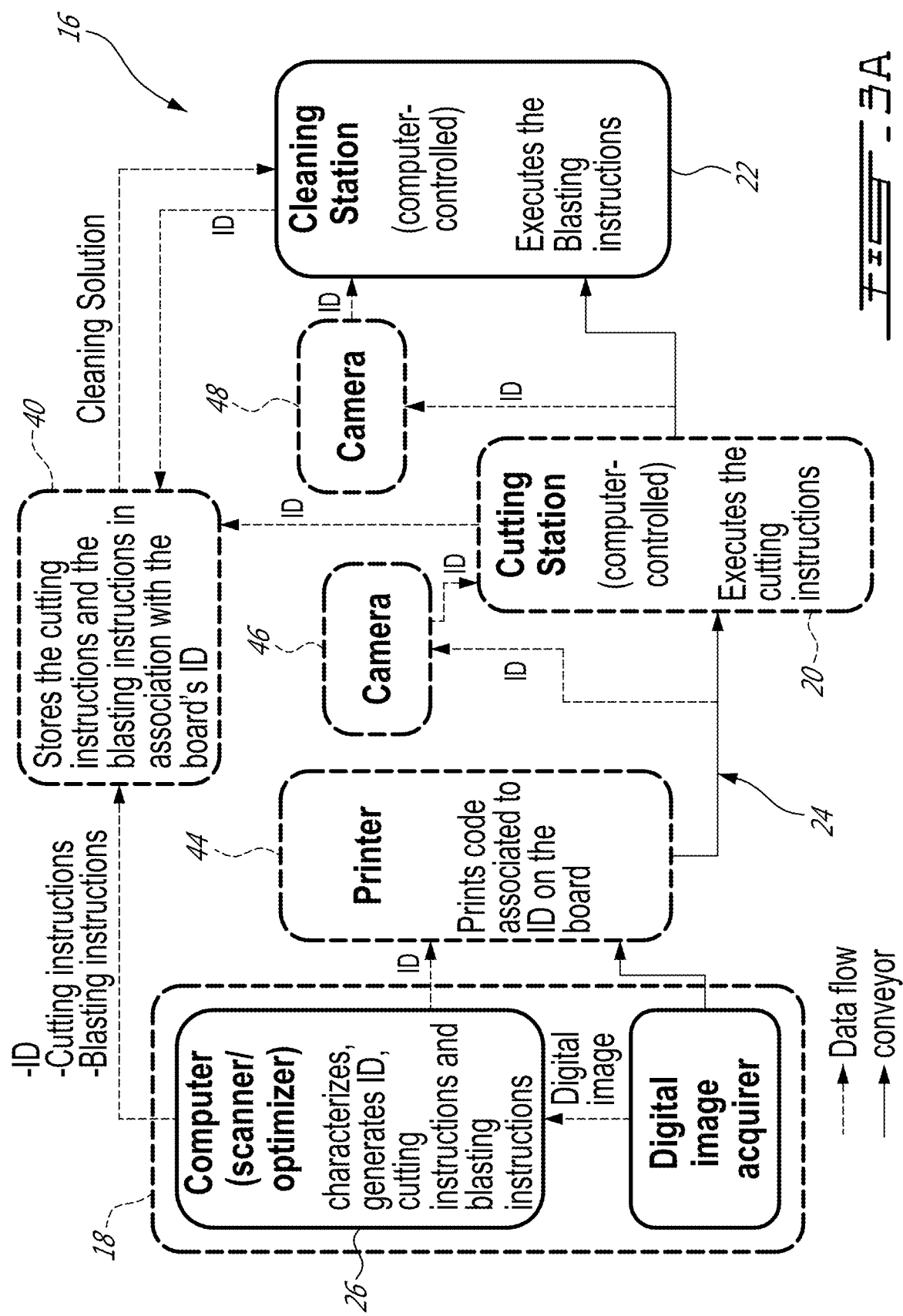
FIG. 3A is a block diagram of a system for making wood flooring boards, in accordance with an example.

FIG. 3A schematizes an example of a wood flooring production system 16. The wood flooring production system 16 includes a sequence of stations 18, 20, 22 in this case, and is provided with a conveyor system 24 to assist in the conveyance of wood boards across stations and from one station to the next. The conveyor system 24 can be continuous, meaning that the order of boards is preserved between different stations, or discontinuous, meaning that piles of boards are made between at least one pair of stations and that the order of boards can change from one station to another. A first station in the sequence will be referred to herein as an image acquisition station 18, or scanning station. The image acquisition station 18 is designed to acquire a suitable digital image of at least one, preferably both, main faces of the wood board 10. Defects 12, 14 in the digital images are characterized using a computer 26. This characterization can include identifying a defect and determining an area occupied by the defect in a coordinate system which can be made to match a coordinate system used by a cleaning station 22 later in the sequence. The components performing these functions can be referred to herein as an artificial vision system. Such functions have been used in association with systems adapted to perform optimization of the value of the wood boards by cutting and can be performed by systems commonly referred to as scanners or optimizers and available from various manufacturers, such as EBI Electric in St-Georges, Quebec, Canada, or can alternately be performed by a dedicated system which can be specifically adapted to obtain a 2D or 3D digital image best suited for the cleaning station 22 operation. Typical scanners produce a 2D image of the entire board, and can be calibrated in a manner to map pixels of the digital image of a face of the board to a coordinate system corresponding to a longitudinal distance and a transversal distance from an origin, typically located at a given corner of the board's face, for instance.

The characterization can further include the attribution of a classification to the defect. For instance, some defects may be associated to a class categorizing them as requiring removal by cutting, whereas other defects may be associated to another class categorizing them as repairable by application of wood filler, and therefore to be ignored, or otherwise addressed as such, from the point of view of the cutting operation. Additional classes of defects than the two presented above can also be used. Attribution of the classification of defect can be made with the same computer 26 than the one performing the identification and localization functions for simplicity, by providing this computer with suitable software, or with another computer, via a suitable data communication means, as desired.

In one embodiment, for instance, three types of defects were defined:

Type A defect: "round", ratio of length/width<given value (e.g. 3);

Type B defect: "ellipsoid", ratio of length/width>given value (e.g. 3); and

Type C defect: "walnut pith", ratio of length/width>given value (e.g. 3).

In which every defect identified was attributed a width and a length. Walnut pith is a common defect which was considered easy to identify on walnut boards. Other types of defects were characterized as A or B depending on their length/width ratio.

An example algorithm can include a first step which determines a contour of a knot, which then associates a type of defect to the knot, decomposes the area of the knot with a parametrable resolution. Adjacent defects can also be fusioned according to a tolerance which can be parametrable. Defects identified as having the same location but on opposite faces of the boards can be categorized as such to trigger activation of simultaneous blasting on opposite faces of the boards, for instance.

Corresponding cleaning strategies could then be used. For instance, it may be preferred to clean type A defects with an oscillating path, at a given speed, type B defects with a straight path, at a lower speed, and type C defects with a straight path, but at a higher speed, for instance.

Various classifications of defects are possible and various cleaning strategies are possible, the examples presented above are presented for indicative purposes only, and are by no means considered to form a definite classification or cleaning solution system.

More generally, once the defect has been characterized, a computer can generate computer-readable blasting instructions which will be subsequently used by the cleaning station to blast the defect. The blasting instructions can be in the form of a 2D path spanning the area of the defect, but more complex blasting instructions can alternately be automatically generated based on 3D images of defects, and which can include varying nozzle inclinations, for instance, if found more suitable in some embodiments. A graphical representation of an example of a 2D path 28 forming blasting instructions is shown in FIG. 4. In this example, the computer selects a length 30 and a width 32 of an ellipse 34 to closely match the defect while entirely spanning the area of the defect. Given a known shape and dimension of the blast jet exiting the nozzle, a zig-zag pattern can be automatically generated as shown to entirely cover the ellipse 34, in the relevant coordinate system. The zig-zag pattern can be characterized by successive and inversely alternating oblique lines each having a given displacement distance and spanning the entire width 32 and a given step 36 of the length of the ellipse 34. Other shapes of blasting paths can be used as well, such as a spiral shape for instance, as found suitable in the context of specific applications.

Moreover, it will be understood that rather than simplifying the shape of the defect to an ellipse such as suggested above, the exact shape of the defect can be characterized, and the blasting path can be made to more closely match the exact shape, to gain in efficiency and minimize blasting time, for instance. The speed of travel along the blasting path can be constant in this embodiment. It can be set to a fixed value and automatically applied by the blasting station, or alternatively, if the characterization of the defect includes the attribution of a class to the defect, different travel speeds can be associated to different classes of defects, for instance. Moreover, in some embodiments, it may even be preferred to use speed of travel values which vary along the blasting path, such as by slowing down along segments associated with regions of the defect identified as requiring particular attention, for instance. Indeed, it is expected that as applications develop, and that all available technologies, such as 3D scanning and Artificial Intelligence (AI), become applied, the range of potential control of the blasting operation is expected to increase.

Three different types of blasting media were tested: wood shreddings, shredded corn cob, and shredded nut shells. Wood shreddings were found to have low efficiency and to be difficult to control, often resulting in blockages of the blast nozzles. Both shredded corn cob and shredded nut shells were found to be easy to control. Nut shells were found to provide better efficiency. The costs were higher than shredded corn, but it is possible to re-use shredded nut shells 5 or 6 times, and overall the gain in efficiency may be worth the costs. The costs of blasting 30 million square feet were estimated to 15 000$ for shredded corn cob, and to 25 000$ for shredded nut shells. While somewhat satisfactory results were achieved on small scale testing using wood shreddings and sand, larger scale tests were found more satisfactory with shredded nut shells and shredded corn cob. Such larger scale tests were conducted on red oak, maple and walnut "classic" wood boards, and some thinner lamellae were tested as well. The blasting was performed for 1 second. The results were good, the cleaning was considered sufficient, and better results were achieved using shredded nut shells. The surrounding portions of the boards appeared unaffected by the blasting. In duration tests on portions of the boards which did not have defects, blasted zones only became visibly distinguishable from non-blasted zones when blasting was performed for over 15 seconds. It is believed that such undesirable effects can easily be avoided in a production setting when blasting is performed for 1 second, for instance. It is likely that still other media could be suitable or even better adapted to the specifics of alternate embodiments.

The computer which generates the blasting instructions can be the same computer 26 that performs the characterization of the defect and which is also used to generate cutting instructions, or different computers can be used if desired. Indeed, in a typical wood flooring production line, a cutting station 20 will be used to cut the wood boards 10 in accordance with cutting instructions generated based on the optimizing function, but it will be noted here that this station is optional. In a context where such a cutting station is present, the computer generating the cutting instructions and the blasting instructions can store both sets of instructions in a common database 40, such as an SQL database provided by a scanner manufacturer for instance, for later access by the cutting station 20 and by the cleaning station 22, respectively. Typically, dedicated computers, which may be referred to as controllers, will form part of the cutting station 20 and of the cleaning station 22 and will be used to execute the cutting instructions and the blasting instructions, respectively. Alternately, any suitable computer can be used to execute the cutting instructions and/or the blasting instructions.

FIG. 3B shows another example embodiment. In the example shown in FIG. 3B, the blasting instructions are sent directly from the scanning station 118 to the cleaning station 120. The latter is positioned directly after the scanning station 118 in the conveyor path 124, and a cutting station 122 may, or may not, be used after the cleaning station 120. Accordingly, the cleaning station 120 can be provided with its own database memory. The ID and the cutting instructions can be sent to a separate memory, such as a PLC memory 140 for instance, which may be directly accessed by the cutting station 122 if a cutting station 122 is used. In an embodiment such as the one depicted in FIG. 3B and where a cutting station 122 is indeed used after the cleaning station 120, an air knife, brush, or any other suitable system 142 can be used to remove loose debris/media on the board between the two stations 120, 122.

Some embodiments may not require elaborated tracking systems. For instance, if the cleaning station 120 is located immediately subsequent to the scanning station 118, if a continuous conveyor system is used between the two, or if the scanning is performed at the cleaning station 120, one may expect with a reasonably high degree of likelihood that the digital image used to produce the blasting instructions corresponds to the wood board which is currently being processed by the cleaning station. In such cases, it can be relatively straightforward to apply the next set of blasting instructions when the next board is detected at the cleaning station, and so forth. However, in embodiments where an additional cutting step is performed between scanning and cleaning, in scenarios where the conveyor system is discontinuous between scanning and cleaning, or where boards are otherwise potentially "mixed" with one another between the scanning station and the cleaning station, it can be preferable to use a dedicated system to track the boards and ensure the fetching of blasting instructions matching the board received by the cleaning station.

In the embodiments shown in FIGS. 3A and 3B, a dedicated tracking system is provided to this end which is based on the printing 44, 144 of ID codes on each board, and the subsequent identification 146, 46, 48, 148 of the boards at the cutting 20, 22, 120, 122 or cleaning stations by "reading" the printed ID code using a corresponding camera 146, 46, 48, 148. In the context of the illustrated embodiment, it was preferred in this embodiment that the computer 26 which generates the cutting instructions and the blasting instructions further generates the an ID associated to the printed code for each board, and stores the cutting instructions and the blasting instructions in association with the ID in a manner to allow the subsequent retrieval of the corresponding instructions by the cutting station 20 or cleaning station 22 following reading of the code. Other tracking systems can be used as will be understood by persons having ordinary skill in the art.

More specifically, in the example presented above, as a board 10 enters the cleaning station 22, the code on the board 10 can be read using a camera positioned upstream of the cleaning station 22, and the cleaning system's computer fetches the blasting instructions associated to the corresponding ID. In an alternate embodiment, it may be preferred to read the code using a combination of two cameras facing opposite sides of the board, at a conveyor junction upstream of the cleaning station, for instance. The cameras can be simple 2D cameras for instance.

Figure 5:
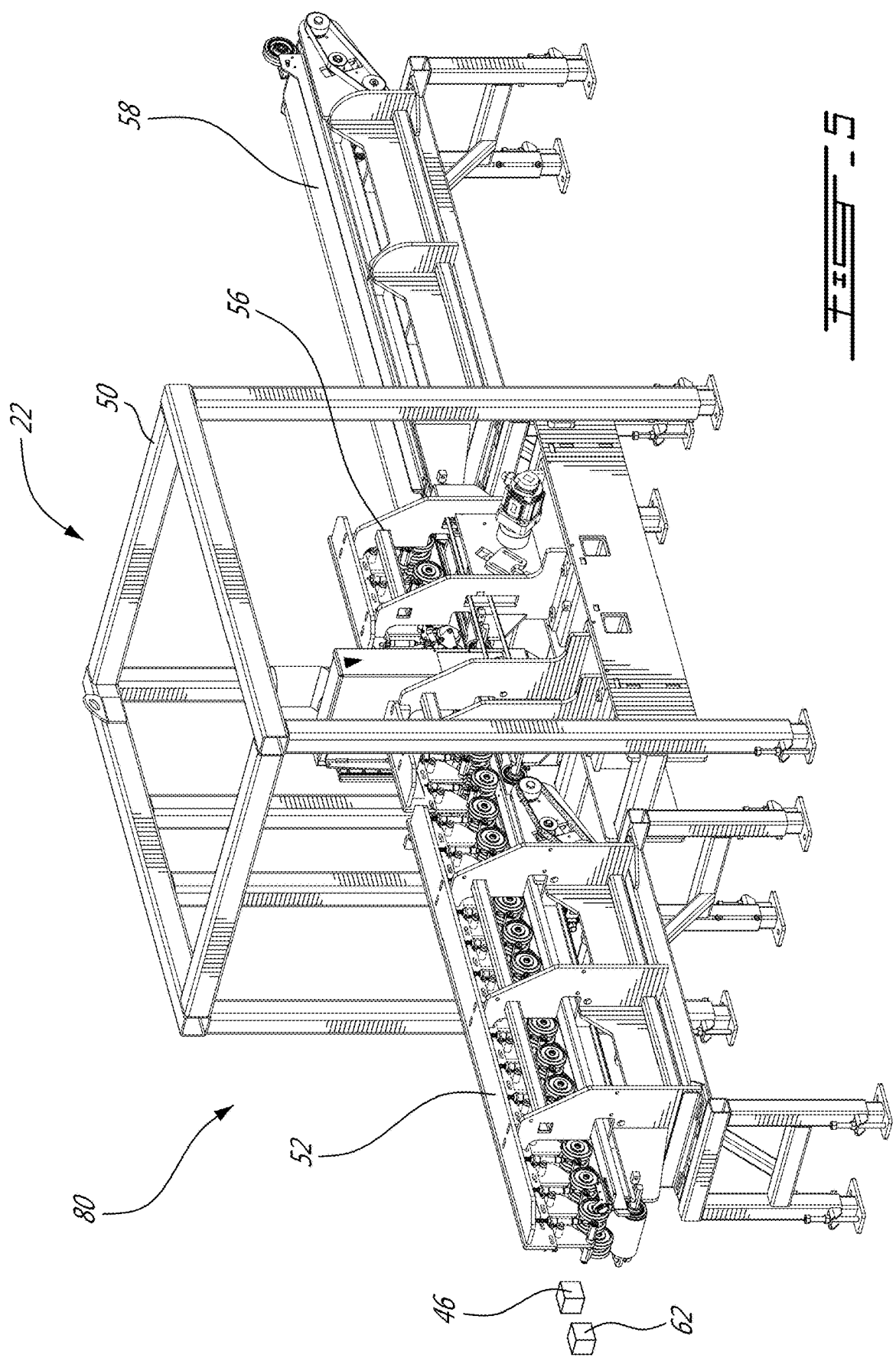
FIG. 5 is an oblique view of a cleaning station taken from the front and the left-hand side, in accordance with an example.

Turning now to FIGS. 5 and 6, an example cleaning station 22 is shown. The cleaning station generally has a frame 50, an ingress conveyor 52 leading to blasting nozzles 54, and a primary egress conveyor 56 and a secondary egress conveyor 58. The ingress conveyor 52 and the primary egress conveyor 56 are equipped with press rollers 60 and act as a wood board holder which not only conveys the board 10 longitudinally, but further holds the wood board 10 relative to the blasting nozzles 54 in the coordinate system of the cleaning station 22. In this specification, the expression frame 50 is used in a broad sense, generally referring to the hardware portions of the cleaning station which do not move relative to a ground reference.

It will be understood that a further challenge to be addressed is to ensure that a close match is achieved between the coordinates of the blasting instructions, based on the digital image, and the corresponding locations on the actual board being held by the cleaning station 22. Various techniques can be used to achieve this calibration. In the embodiment illustrated and detailed below, while it was not assumed that the next board received corresponded to the next image (this being addressed by the tracking system), it is assumed that when the board arrives at the cleaning station, it is in a given orientation (given face up, given end forward), and that one of the sides of the board was positioned in abutment against a longitudinal guide which was made part of the frame of the cleaning system's conveyor. Accordingly, a simple end detector 62 is used to detect the position of the end of the board, which allows to directly map the coordinates of the blasting path 28, coded in terms of say, transversal and longitudinal distance from an origin located at the corner of the board corresponding to the detected end and to the side abutting the guide, onto features of the actual board in the coordinate system of the cleaning station 22. Different techniques can be used to calibrate the coordinates of the blasting path 28 to the coordinate system of the cleaning station 22 as will be understood by persons having ordinary skill in the art.

It will be understood that while tracked relative movement between the board 10 and the blast nozzle 54 can be used to perform the blasting instructions, various techniques can be used to implement such movement. For instance, in the case of a 2D blast path, a holder which fixedly holds the wood board in collaboration with a blasting nozzle which is moveable in two dimensions can be used, or a fixed blasting nozzle in collaboration with a holder which moves the boards in two dimensions would be another solution. In the specific embodiment illustrated, and for reasons which will be apparent to the skilled reader in the specific context described, the solution which was elected was to provide a holder which managed the longitudinal relative displacement between the board and the blast nozzle, and to provide a blast nozzle which is transversally moveable relative to the board's path.

More specifically, the board 10 is first positioned in the cutting station 20 with its given face up, given end forward, and given side abutting against the longitudinal guide which is fixed relative to the frame of the cutting station 20. The ingress conveyor 52 moves the board 10 longitudinally until the location of the forward end of the board 10 is detected by the board end detector 62, at which board the cutting station can apply a reference coordinate system. Indeed, the origin of the coordinate system of the cleaning station 22 can then be set to match the forward end of the board and the side of the board which abuts the longitudinal guide, for instance. At this point, the board 10 is pressed by the press rollers 60 against the conveyor belt 64 of the ingress conveyor 52 and the board is only free to move longitudinally upon action of the ingress conveyor 52. The ingress conveyor 52 is provided with a mechanism, such as a servo motor 66 for instance, which tracks its longitudinal displacement. The computer control can track the longitudinal displacement of the board 10 as a longitudinal translation of the coordinate system and of the origin relative to the frame of the cleaning station 22. The blast nozzle 54 is mounted on a transversally oriented rail 68 and is moveable in the transversal orientation by a mechanism which tracks the transversal displacement, such as a servo motor 70 for instance. The computer control can therefore track, with a suitably high degree of precision, the transversal coordinates of the blast nozzle relative to the coordinate system. Accordingly, the blasting instructions can be executed by blasting along a 2D blast path 28 defined in terms of coordinates on the face of the board, by both, and potentially simultaneously, moving the board longitudinally using the ingress conveyor and moving the blast nozzle transversally using its transversal movement mechanism while operating the blasting system to convey blast media through the blast nozzle 54. Indeed, even in the case of a board 10 which is warped, for instance, it is possible to detect and measure the curvature of the board 10, to express the path in terms of Cartesian coordinates on the face of the board, and to correct the set of Cartesian coordinates based on the measured curvature of the board, as will be understood by persons having skill in the art. For instance, as curved board is conveyed across the cleaning station 22, the edge of the board can become spaced apart from the longitudinal guide due to the curvature. The spacing can be measured by a sensor and the set of coordinates measured from the edge of the board can be offset by a distance corresponding to the length of the spacing to ensure that the nozzle 54 follows the defect notwithstanding the presence of the curve.

In this specific embodiment, in greater detail, it will be noted that the wood board holder 80 is in fact formed of two conveyor sections: the ingress conveyor 52 and the primary egress conveyor 56, both of which are equipped with press rollers 60 and with coordinated servo motors 66. This can allow a suitable holding of the boards 10, and it will also be noted that providing a spacing between the ingress conveyor 52 and the primary egress conveyor 56 allows positioning blast nozzles 54 on both opposite faces of the boards. Indeed, while this is optional, it can be preferred to allow the automated blasting of both faces of the boards using the same cleaning station 22 as this can allow a gain in efficiency by contrast with using subsequent stations which perform the blasting on respective faces. Performing blasting on both faces can be performed with digital images of both faces which were both treated via an artificial vision system to characterize defects potentially on both opposite faces, and by obtaining blasting instructions for each side. Indeed, images of both opposite faces can be registered in the same coordinate system by using a same corner as an origin. Moreover, defects having matching coordinates can be categorized as through-holes, for instance. In the illustrated embodiment, the two blast nozzles are collectively controlled, meaning that they are moved together along the transversal orientation using a single transversal movement mechanism. However, it will be understood that in alternate embodiments, the blast nozzles can be independently controlled.

The steps which will follow the cleaning station can vary depending on the specific embodiment. It is understood that a brush or air knife to remove debris or media can be used in order to better prepare the board for other steps. Typically, these steps will include filling the blasted defect with a wood filler and sanding the face of the board. The face of the board can then be varnished. However, in some embodiments, it can be preferred to brush the surface of the wood board with a metal brush to accentuate the wood grain appearance prior to varnishing.

As can be understood, the examples described above and illustrated are intended to be exemplary only. Various modifications can be made in alternate embodiments. For instance, in the embodiment presented above, a fixed blasting angle which is slightly off normal from (non-perpendicular to) the face of the wood board is used to reduce the amount of blast media reflected directly into the impinging path. In alternate embodiments, a different angle can be used, adjustable angles can be used, or even adjustable aperture and adjustable air pressure. Moreover, while the above teachings are presented in the context of wood flooring, it will be understood that they can readily be applied to blasting defects in wood pieces other than wood boards. This could be achieved by using a robot which manipulates the board through a nozzle area, or which manipulates a nozzle over the board, for instance. The scope is indicated by the appended claims.

What is claimed is:

1. A method of making a wood flooring board, the method comprising:
    obtaining a digital image of a wood board having a defect, the digital image including a representation of the defect;
    using a computer:
        mapping the position and shape of the representation of the defect;
        generating blasting instructions based on the mapped position and shape;
    positioning the wood board in a given position in a cleaning station, the cleaning station having a blasting nozzle and holding the wood board in its coordinate system;
    the cleaning station automatically moving the blasting nozzle relative to the wood board and blasting the defect with blasting media based on the blasting instructions, including moving at least one of the blasting nozzle and the wood board relative to a frame of the cleaning station;
    wherein the computer further attributes a classification to the defect, and wherein the blasting instructions are further based on the defect classification.

2. The method of claim 1 wherein the digital image is obtained using a linear wood board scanner operating while moving the wood board along a production line.

3. The method of claim 1 wherein the digital image includes a representation of at least one complete face of the wood board.

4. The method of claim 3 wherein the virtual coordinate system of the wood board having an origin at a given corner of the complete face.

5. The method of claim 3 wherein the digital image includes a representation of at least both opposite faces of the wood board.

6. The method of claim 4 wherein the computer further matches corresponding representations of defects on both opposite faces and characterizes matched defects as holes.

7. The method of claim 1 wherein the positioning of the wood board in the given position includes supporting the wood board on a longitudinal conveyor with a side of the wood board abutting against longitudinal guide of the conveyor, and moving the wood board longitudinally using the conveyor.

8. The method of claim 7 wherein the positioning of the wood board in the given position further includes detecting the position of an end of the wood board using a sensor.

9. The method of claim 7 wherein the moving of the blasting nozzle relative to the wood board includes moving the wood board longitudinally using the longitudinal conveyor.

10. The method of claim 9 wherein the moving of the blasting nozzle relative to the wood board further includes moving the blasting nozzle along an orientation transversal to the longitudinal conveyor.

11. The method of claim 1 wherein the computer further generates an ID associated to the wood board, and stores the blasting instructions associated with the ID in a memory.

12. The method of claim 11 further comprising printing a code associated to the ID on the wood board, and wherein the cleaning station further reads the code on the wood board and retrieves the blasting instructions from the memory based on the associated ID.

13. The method of claim 12 wherein the computer further determines a cutting solution, generates cutting instructions, and stores the cutting instructions in the memory in association with the ID.

14. The method of claim 13 further comprising a cutting station reading the code on the wood board, retrieves the cutting instructions from the memory based on the associated ID, and cuts the board in accordance with the cutting instruction.

15. The method of claim 1 further comprising applying a filler to the defect subsequently to said blasting.

16. The method of claim 15 further comprising brushing and sanding the board and the filler.

17. The method of claim 1 wherein at least one of a path and a speed of the blasting instructions are based on the defect classification.

18. A cleaning station for a wood flooring board having a defect, the cleaning station comprising:
 a wood board holder for holding the wood flooring board in a cleaning station,
 a camera configured for obtaining a digital image of the wood flooring board including a representation of the defect;
 a blasting nozzle,
 a mechanism configured to move the blasting nozzle relative to the wood board by moving either one, or both, of the wood board holder; and
 a computer having a processor and non-transitory memory with instructions stored thereon which, when executed by the processor, are operable to:
  map the position and shape of the representation of the defect;
  attribute a classification to the defect;
  control the mechanism based on the blasting instructions, based on the mapped position and shape, and based on the defect classification.

19. The cleaning station of claim 18 wherein the wood board holder includes a longitudinal conveyor having a longitudinal guide receiving a side of the wood board in longitudinal sliding abutment thereagainst.

20. The cleaning station of claim 19 further comprising a plurality of rollers pressing the wood board against the conveyor, the conveyor being operated by a mechanism which tracks the longitudinal displacement of the board, allowing to move the board longitudinally in the cleaning station coordinate system based on the blasting instructions.

21. The cleaning station of claim 20 wherein the blasting nozzle is slidably mounted on a transversally oriented rail, the blasting nozzle being slidable along the transversally oriented rail by a mechanism which tracks the transversal displacement of the blasting nozzle, allowing to move the blasting nozzle transversally in the cleaning station coordinate system based on the blasting instructions.

22. The cleaning station of claim 18 further comprising a reader configured to read a code printed on the wood board, and further being configured for the computer to retrieve the blasting instructions based on an ID of the wood board associated to the code.

23. A method of making a wood flooring board, the method comprising:
 obtaining a digital image of a wood board having a defect, the digital image including a representation of the defect;
 using a computer:
  mapping the position and shape of the representation of the defect;
  attributing a classification to the defect;
 positioning the wood board in a given position in a cleaning station, the cleaning station having a blasting nozzle and holding the wood board in its coordinate system; and
 depending on the classification of the defect, either:
  i) removing the defect by cutting, or
  ii) the cleaning station automatically moving the blasting nozzle relative to the wood board and blasting the defect with blasting media based on blasting instructions generated by the computer based on the mapped position and shape of the representation of the defect, including moving at least one of the blasting nozzle and the wood board relative to a frame of the cleaning station.

* * * * *